United States Patent

[11] 3,547,184

| [72] | Inventors | Byron W. Kock;<br>William D. Navarro, Toledo, Ohio |
|---|---|---|
| [21] | Appl. No. | 774,698 |
| [22] | Filed | Nov. 12, 1968 |
| [45] | Patented | Dec. 15, 1970 |
| [73] | Assignee | National Lead Company<br>New York, N.Y.<br>a corporation of New Jersey |

[54] DIE CASTING MACHINE
11 Claims, 6 Drawing Figs.

[52] U.S. Cl.......................................... 164/343;
18/2, 18/30; 164/312, 164/347
[51] Int. Cl..................................................... B22d 17/10,
B22d 17/22
[50] Field of Search....................................... 164/303
—305, 312, 314, 315, 342—343, 347, 344;
18/30LA, WP, 2RP, RM

[56] References Cited
UNITED STATES PATENTS

| 2,112,342 | 3/1938 | Lester........................... | 164/347X |
| 3,165,796 | 1/1965 | McDonald..................... | 164/340X |
| 3,433,292 | 3/1969 | McDonald..................... | 164/343 |

Primary Examiner—Robert D. Baldwin
Attorney—Owen & Owen

ABSTRACT: A die casting machine for making highly complex parts which require cores to be moved into position from several sides. The machine is characterized by a central member disposed between a stationary platen and a movable platen of a cold chamber die casting machine. The central member is separately movable axially of the machine with respect to both the stationary platen and the movable platen. Upper and lower plunger assemblies are mounted on the central member and carry die parts which cooperate with each other and with die parts carried by the stationary and movable machine platens to form a complete die cavity.

DIE CASTING MACHINE

BACKGROUND OF THE INVENTION

Conventional cold chamber die casting machines comprise a stationary front platen on which the cover die is mounted and a movable platen which carries the ejector die together with whatever core slides are necessary to form a complete die cavity. Normally, the core slides move with the ejector die and the cores may be arranged to enter the die cavity from the top, bottom and both sides. While such a machine has great flexibility enabling nearly any complicated part to be die cast, the machine in itself is highly complex. Further, elaborate expedients are frequently necessary to hold all of the cores locked in place under the very high pressures involved in the die casting process.

SUMMARY OF THE INVENTION

The machine of the present invention includes many of the elements of a conventional cold chamber die casting machine including stationary and movable platens. However, interposed between these conventional elements, the invention provides a separate central member that is reciprocable on the frame of the machine and is carried by the tire bars thereof. The central member carries upper and lower plunger elements to which dies are affixed which cooperate with die parts carried by the conventional machine platens to form a complete die cavity. The cavity is thus formed between the upper and lower plunger elements and opens in a plane at right angles to the conventional plane of opening of a die casting machine or in a plane parallel to the axis thereof. The elements corresponding to the ejector plate of a conventional die casting machine are carried by the central member and serve to eject the casting in a lateral direction with respect to the longitudinal axis of the die casting machine.

The plunger elements are provided with wedge locking surfaces which cooperate with mating surfaces on the movable and stationary machine platens to lock all of the die blocks firmly in place when the machine is closed for a casting shot.

DETAILED DESCRIPTION OF A PREFERRED EMBODIMENT

Figure 1:
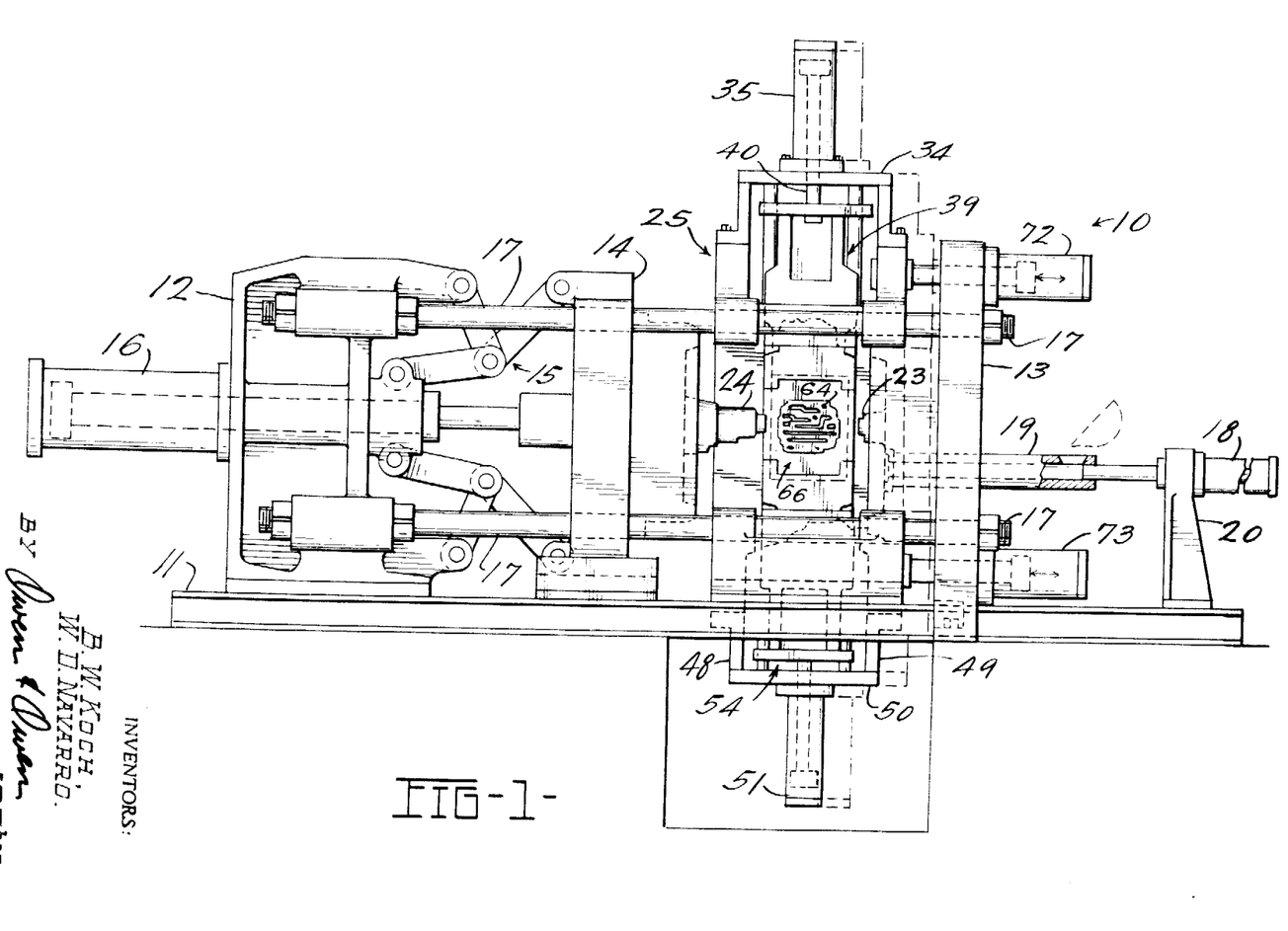
FIG. 1 is a side elevational view, with parts broken away, of a die casting machine incorporating the present invention and showing the die parts in an open position.

Referring to the drawings, and particularly to FIG. 1, the present invention is a die casting machine generally indicated by the reference number 10. The die casting machine 10 includes a track base 11 on which a rear plate 12 is adjustably mounted. A stationary front platen 13 is fixed to the track base 11 and a movable platen 14 is mounted intermediate the rear plate 12 and the stationary platen 13. The movable platen 14 is actuated by a conventional toggle mechanism 15 which, in turn, is moved by a closing cylinder 16. Machine tie bars 17 connect the rear plate 12 and the stationary platen 13 and serve as guides for the movable platen 14. At the front of the machine 10 there is a conventional shot cylinder 18, a shot sleeve 19 and a pedestal 20 which supports the shot cylinder 18.

Figure 2:
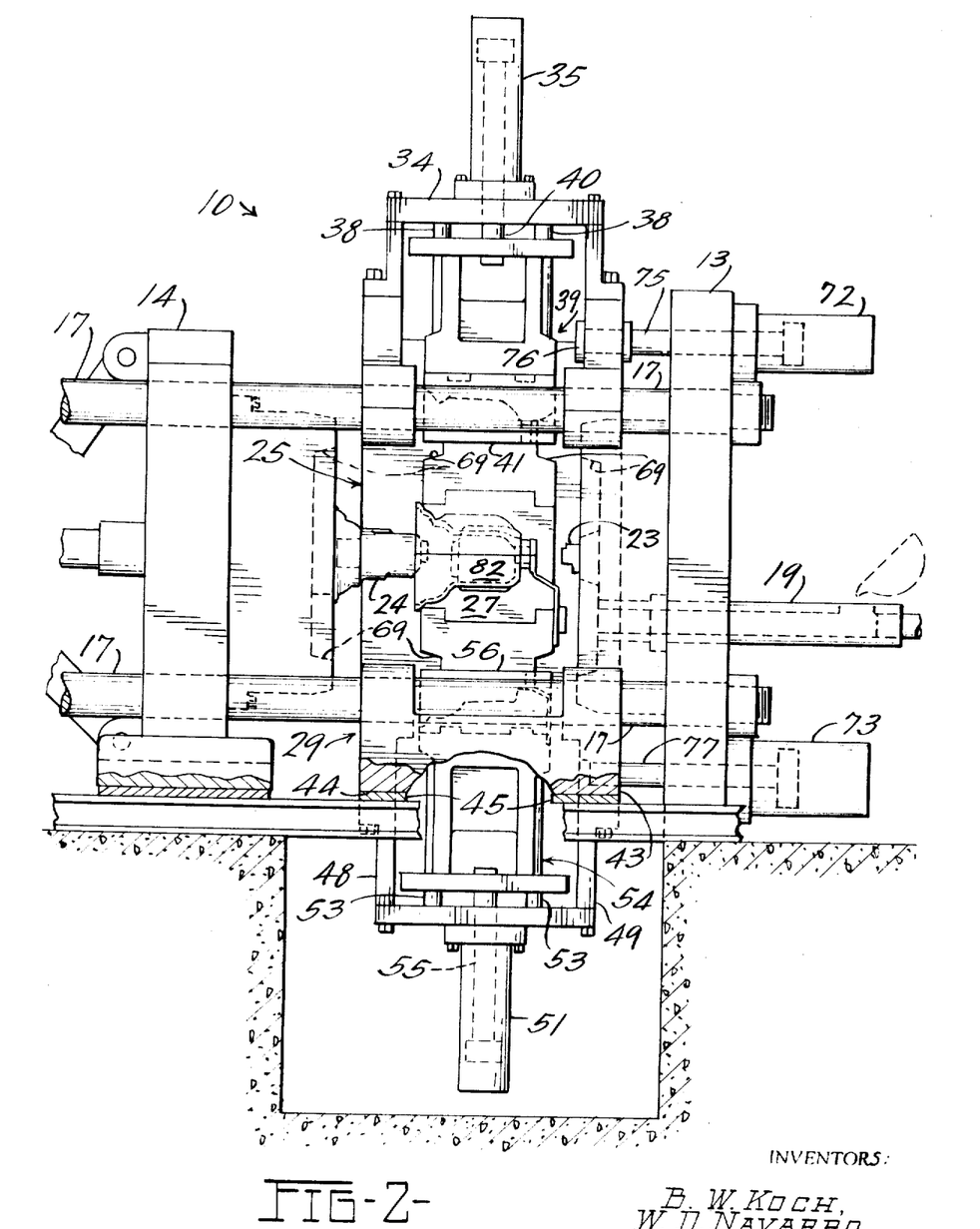
FIG. 2 is an enlarged side elevational view of a portion of the machine shown in FIG. 1.

Referring to FIG. 2, a die part 23, in this embodiment a core, is mounted on the stationary platen 13. Similarly, a die part 24, in this embodiment also a core, is mounted on the movable platen 14.

Figure 4:
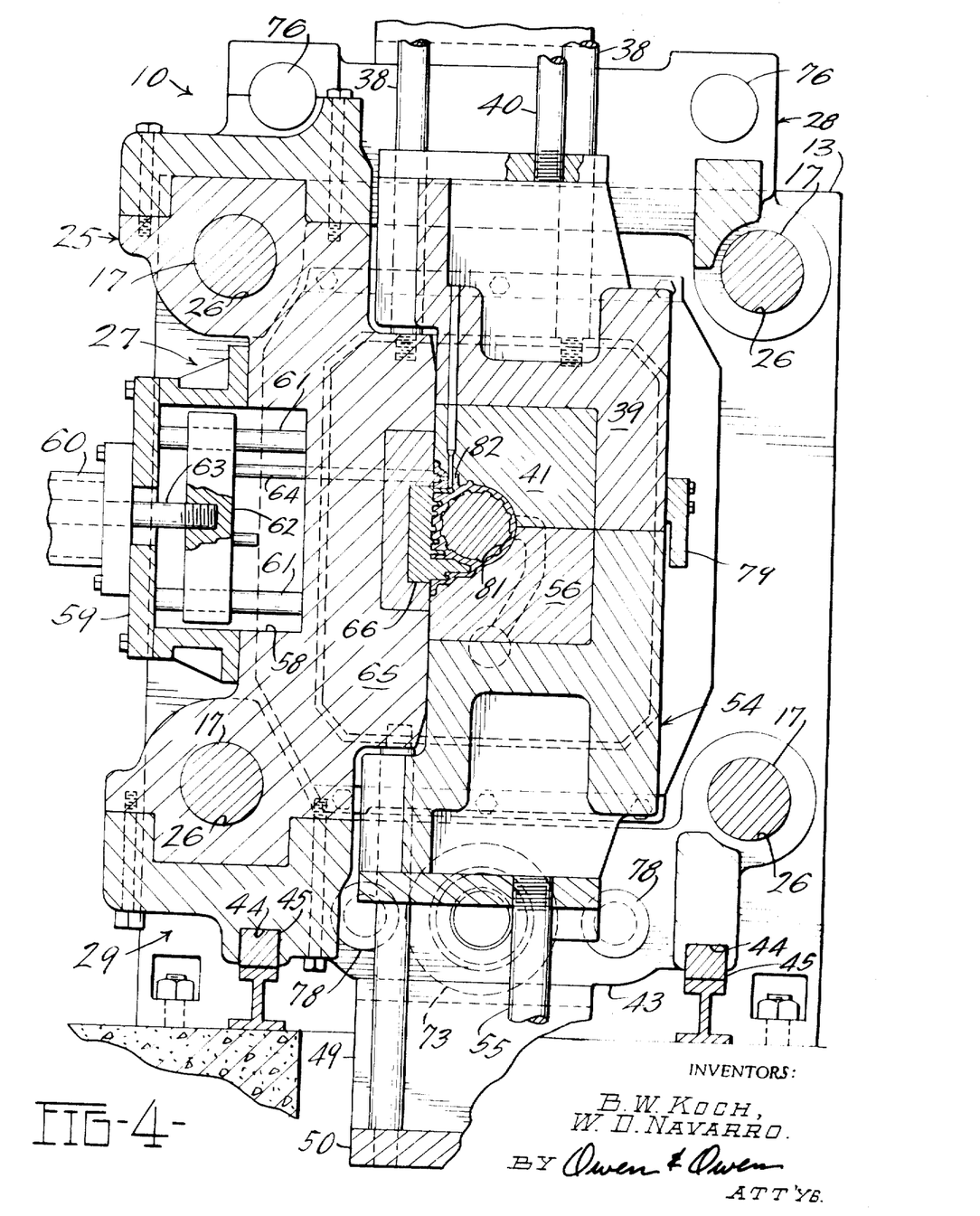
FIG. 4 is a vertical sectional view taken along the line 4—4 of FIG. 3 and showing the die parts in a closed position.
Figure 5:
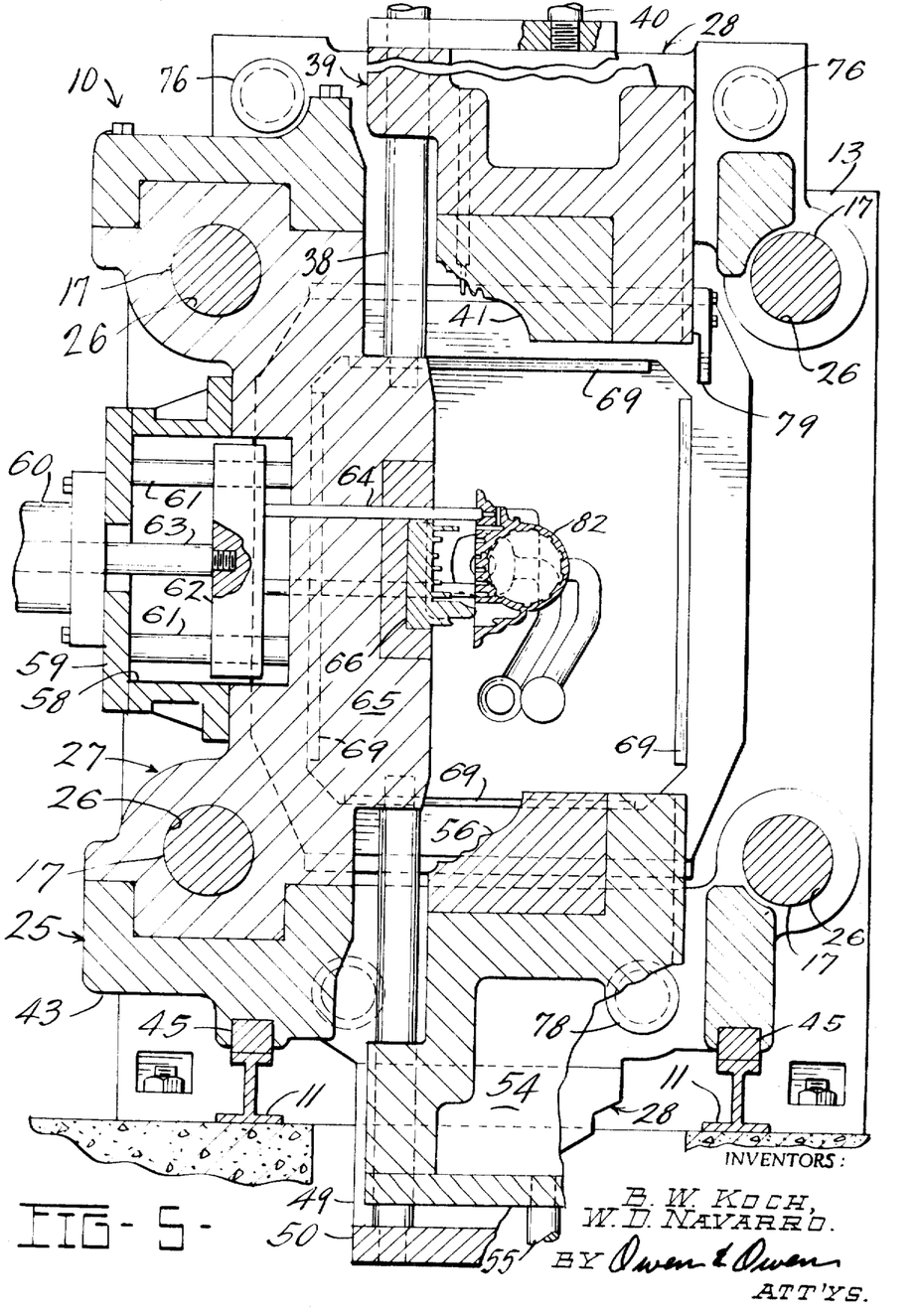
FIG. 5 is a view similar to FIG. 4 showing the die parts in an open position and showing the ejection of a completed die casting.

A generally C-shaped central member 25 is interposed between the stationary platen 13 and the movable platen 14. Referring to FIGS. 4 and 5, the central member 25 includes four guide openings 26. Each of the tie bars 17 extends through a respective one of the guide openings 26. The tie bars 17 guide the central member 25 during its reciprocal movement.

Figure 3:
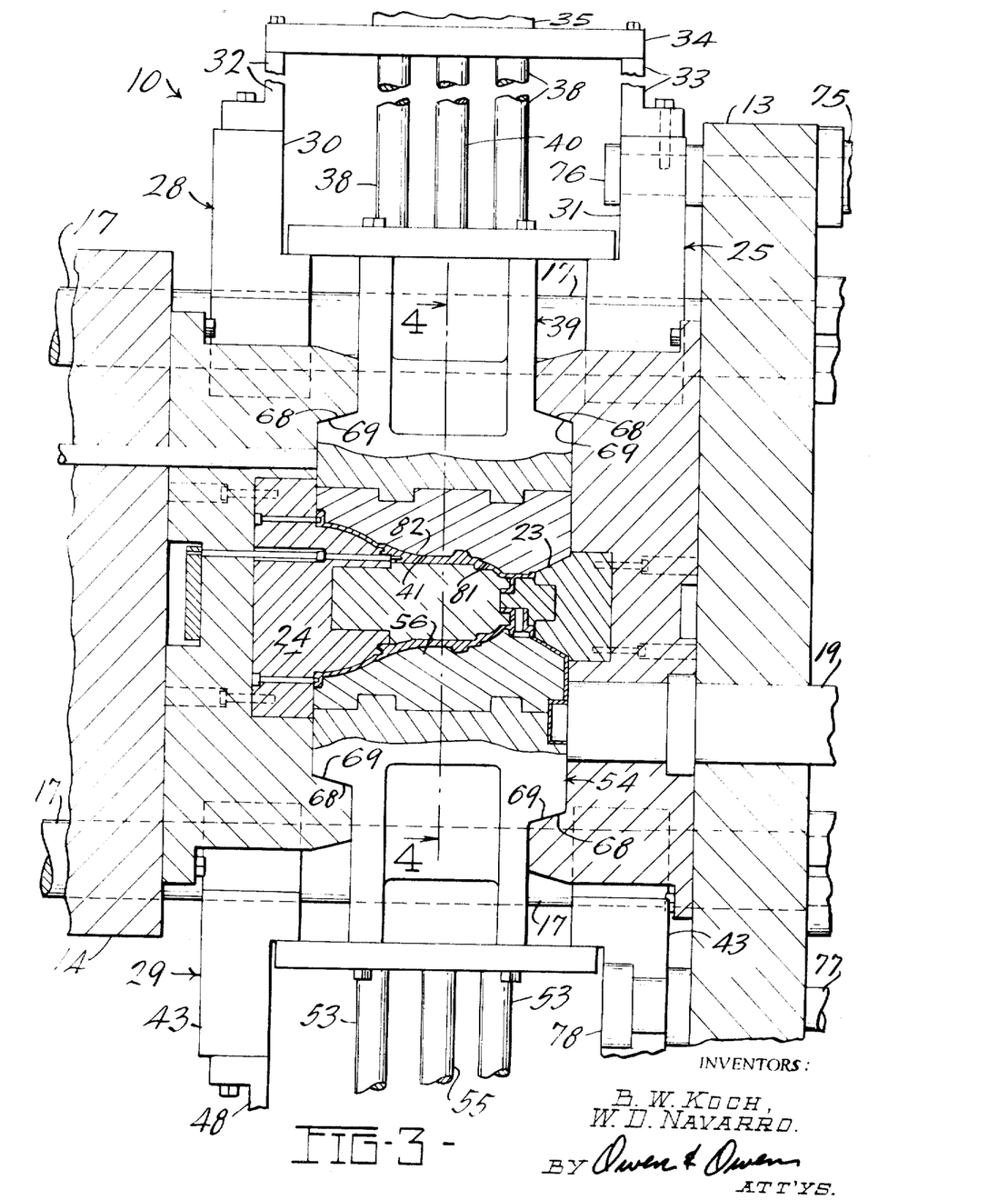
FIG. 3 is a view similar to FIG. 2, drawn on an enlarged scale and showing the die parts in a closed position.
Figure 6:
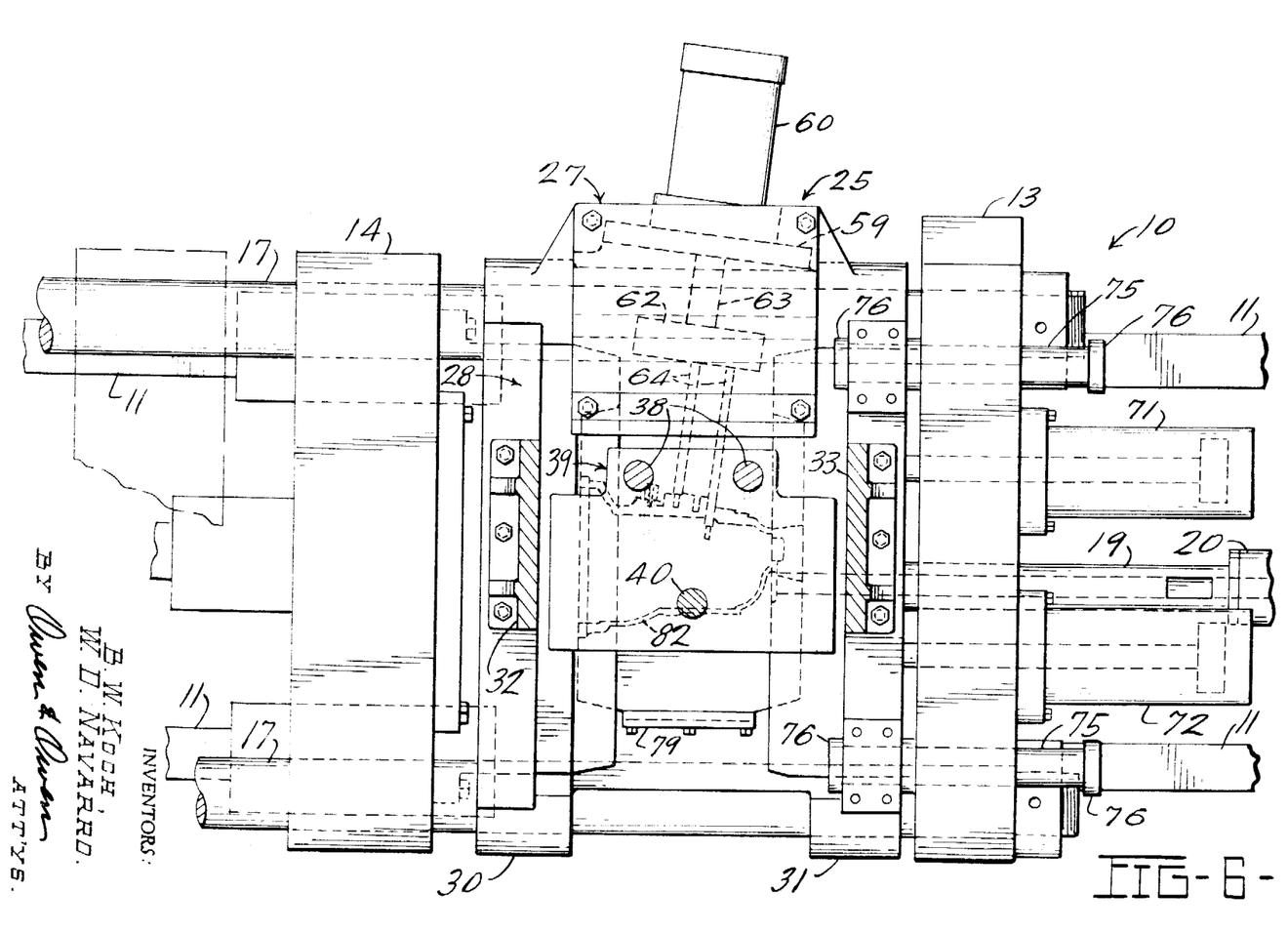
FIG. 6 is a fragmentary view of the die casting machine.

Referring to FIG. 4, the central member 25 includes a generally vertical back assembly 27, a generally horizontal top assembly 28 and a generally horizontal bottom assembly 29. Referring to FIGS. 3 and 6, the top assembly 28 includes two parallel, horizontal support members 30 and 31. The support member 30 mounts a bracket 32 and the support member 31 mounts a bracket 33. A platform 34 extends between the upper ends of the brackets 32 and 33 and supports a vertically positioned cylinder 35 (see FIG. 2).

Referring to FIGS. 2, 3 and 6, the horizontal top assembly 28 includes a pair of vertical guide rods 38 which mount and guide an upper plunger body 39. A rod 40 of the cylinder 35 is connected to the plunger body 39 and the cylinder 35 moves the plunger body 39 between an upper position shown in FIG. 5 and a lower die casting position shown in FIG. 4. A die part 41 is mounted on the lower end of the plunger body 39.

Referring to FIGS. 2 and 4, the bottom assembly 29 of the central member 25 includes horizontal support members 43 which define lower slots 44. The lower slots 44 receive bearing shoes 45. The shoes 45 slide along the track base 11 as the central member 25 is moved.

Vertical bracket members 48 and 49 depend from the generally horizontal support members 43. A horizontal platform 50 extends between the brackets 48 and 49 and mounts a vertically extending cylinder 51 (see FIG. 2). A pair of vertical guide rods 53 extend upwardly from the platform 50 to guide the vertical movement of a lower plunger body 54. A rod 55 of the cylinder 51 extends through the platform 50 and is connected to the lower plunger body 54. Referring to FIGS. 3 and 4, a die part 56 is mounted on the upper end of the lower plunger body 54.

Referring to FIGS. 4 and 5, the back assembly 27 of the central member 25 extends between the top assembly 28 and the bottom assembly 29 and defines a cavity 58. A backplate 59 serves as the rear wall of the cavity 58 and mounts a generally horizontal ejector cylinder 60. Horizontal guide bars 61 are positioned within the cavity 58. The guide bars 61 both guide and support an ejector plate 62. A rod 63 of the ejector cylinder 60 extends through the backplate 59 and is connected to the ejector plate 62. Ejector pins 64 are mounted on the front of the ejector plate 62 and extend through passageways defined in a central portion 65 of the back assembly 27 to eject or remove the completed die casting from the machine 10 (see FIG. 5).

At least one die part is mounted on the central member and serves as a central die part means which cooperates with the die parts mounted on the stationary platen and the movable platen. In the present embodiment, the central die part means comprises the die parts 41, 56 and 66.

A die part 66 is mounted on the front of the central portion 65 of the back assembly 27. In the present embodiment, the die part 66 serves as the ejector die. When the die casting machine 10 is moved to its closed or die casting position (see FIGS. 3 and 4) the die parts 23, 24, 41, 56 and 66 cooperate to form the desired die cavity. Referring to FIG. 3, which shows the die parts in their closed or casting position, the upper plunger body 39 and the lower plunger body 54 are each provided with tapered wedge locking surfaces 68. The stationary platen 13 and the movable platen 14 are each provided with mating wedge surfaces 69 (see also FIG. 2). As the machine 10 is moved to the closed position shown in FIG. 3, the wedge locking surfaces 69 of the upper and lower plunger bodies 39 and 54 mate with the wedge surfaces 69 of the stationary platen 13 and the movable platen 14 to lock the complementary machine parts into a casting position which enables these parts to withstand the sever die casting pressures to which they are subjected.

Referring to FIGS. 2 and 6, a pair of horizontal upper cylinders 71 and 72 and a horizontal lower cylinder 73 are mounted on the stationary platen 13. The rods of the cylinders 71, 72 and 73 extend through the stationary platen 13 and are connected to the central member 25. The cylinders 71, 72 and 73 are actuated tp reciprocate the central member 25 longitudinally along the track base 11. Referring in particular to FIGS. 4 and 6, a pair of stop rods 75 having stop flanges 76 on their outer end extend between the top assembly 28 of the central member 25 and the stationary platen 13. The stop rods 75 are journaled for longitudinal movement with respect to the stationary platen 13 and are effective to control or limit longitudinal movement of the central member 25 along the tie bars 17. Similarly, referring in particular to FIGS. 3 and 4 a pair of lower stop rods 77 having stop flanges 78 at their outermost ends extend between the stationary platen 13 and the bottom assembly 29 of the central member 25.

In the present embodiment, a flash guard 79 is mounted on the plunger body 39. When the die casting machine 10 is in the closed position, shown in FIG. 4, the flash guard 79 extends downwardly over the junction line between the upper plunger body 39 and the lower plunger body 54.

In a typical die casting operation using the machine 10, the machine is cycled to the closed or die casting position shown in FIGS. 3 and 4. The die parts 23, 24, 41, 56 and 66 are in their wedge lock position. As in a conventional die casting operation, the shot cylinder 18 forces the metal into a die casting cavity 81. A die casting 82 is formed in the cavity 81. At this time, the closing cylinder 16 is actuated. The toggle mechanism 15 moves the movable platen 14 to the left, as viewed in FIG. 1. Next, the horizontal cylinders 71, 72 and 73 are actuated and the entire central member 25 is moved to the left. As explained above, the movement of the central member 25 is limited by the upper stop rods 75 and the lower stop rods 77.

At this time, the upper cylinder 35 and the lower cylinder 51 are both actuated. The upper cylinder 35 moves the plunger body 39 upwardly while the lower cylinder 51 moves the plunger body 54 downwardly. Next, referring to FIGS. 4 and 5, the ejector cylinder 60 is actuated and the ejector plate 62 and ejector pins 64 are moved inwardly to force the die casting 82 off the ejector die part 66. The machine is then moved back to the closed position shown in FIGS. 4 and the above casting cycle is repeated.

The die casting machine 10, according to the present invention, provides a die casting machine which is suitable for use in producing complex die casting.

We claim:

1. A die casting machine comprising, in combination, a longitudinally extending base, a generally vertical stationary platen mounted on said base a first die part mounted on said stationary platen, a generally vertical movable platen positioned on said base in a parallel relationship with said stationary platen, a second die part mounted on said movable platen for means for moving said movable platen between an open positioned and a closed die casting position, a generally C-shaped central member positioned between said stationary platen and said movable platen, independent means for moving said central member along said base, a central die part means mounted on said central member, said first and second die parts and said central die part means forming a die cavity when said machine is in the closed or die casting portion, and ejector means mounted on said central member for ejecting completed die castings in a generally lateral direction with respect to the longitudinal axis of said die casting machine.

2. A die casting machine, according to claim 1, including a generally vertical rear plate mounted on said base, and wherein said means for moving said movable platen includes a closing cylinder mounted on said rear plate and a toggle mechanism connected between said rear plate and said movable platen, said closing cylinder being operatively connected to said toggle mechanism.

3. A die casting machine, according to claim 1, including a plurality of generally horizontal tie bars extending between said rear plate and said stationary platen, said central member being mounted for movement along said tire bars.

4. A die casting machine, according to claim 3 wherein said central member includes a generally horizontal top assembly, a generally horizontal bottom assembly and a back assembly extending between and connected to said top assembly and said bottom assembly and wherein said central die part means includes third, fourth and fifth die parts connected to said assemblies.

5. A die casting machine, according to claim 1, whereby said ejector means includes an ejector cylinder mounted on said central member and at least one ejector pin operatively connected to said ejector cylinder, said central member and said central die part means defining a passageway for said ejector pin.

6. A die casting machine, according to claim 4, including a first plunger means mounted on said top assembly of said central member and a second plunger means mounted on said bottom assembly of said central member, said first plunger means including an upper plunger cylinder, an upper plunger body operatively connected to said upper plunger cylinder and said fourth die part removably connected to the lower end of said upper plunger body, said second plunger means including a lower plunger cylinder, a lower plunger body operatively connected to said lower plunger cylinder and said fifth die part connected to the upper end of said lower plunger body, said third die part being mounted on said back assembly of said central member, said upper and lower plunger cylinders being effective to move said fourth and fifth die parts into a complementary relationship with said first, second and third die parts when said machine is in the die casting position.

7. A die casting machine, according to claim 6, wherein said upper and lower plunger bodies have tapered surfaces and wherein said stationary platen and said movable platen have mating tapered surfaces, contacting one another and forming a wedge lock when said machine is in the die casting position.

8. A die casting machine, according to claim 1, wherein said means for moving said central member includes at least one generally horizontal cylinder mounted on said stationary plate, said cylinder being operatively connected to said central member.

9. A die casting machine, according to claim 8, including stop means for limiting movement of said central member along the longitudinal axis of said machine, said stop means comprising a plurality of stop bars journaled in said stationary platen and operatively connected to said central member.

10. A die casting machine, according to claim 6, wherein said base includes a pair of longitudinally extending tracks, and shoe means mounted on said bottom assembly of said central member for slidably engaging said tracks.

11. A die casting machine comprising, in combination, a longitudinally extending track base, a stationary platen mounted on said track base adjacent one end of said track base, a first die part mounted on said stationary platen, a rear plate mounted on said track base adjacent the other end of said track base, a movable platen positioned on said track base between said rear plate and said stationary platen, a second die part mounted on said movable platen, a closing cylinder mounted on said rear plate a toggle mechanism connecting said rear plate and said movable platen, said closing cylinder being operatively connected to said toggle mechanism, a plurality of horizontal tie bars extending between said rear plate and said stationary platen, a generally C-shaped central member movably mounted on said track base and tie bars between said movable platen and said stationary platen, independent means for moving said central member along said base, said central member including a top assembly, a bottom assembly, and a generally vertical back assembly extending between said top and bottom assemblies, a third ejector die part mounted on said central member, ejector means mounted on said central member for ejecting completed die castings in a generally lateral direction with respect to the longitudinal axis of said die casting machine, a first plunger means mounted on said top assembly of said central member, said first plunger means including an upper plunger cylinder, an upper plunger body operatively connected to said upper plunger cylinder and a fourth die part connected to said upper plunger body, a second plunger means mounted on said bottom assembly of said central member, said second plunger means including a lower plunger cylinder, a lower plunger body operatively connected to said lower plunger cylinder and a fifth die part connected to said lower plunger body, said upper and lower plunger cylinders being effective to move said fourth and fifth die parts into a complementary relationship with said first, second and third die parts when said machine is moved to the die casting position.

UNITED STATES PATENT OFFICE
CERTIFICATE OF CORRECTION

Patent No. 3,547,184          Dated December 15, 1970

Inventor(s) Byron W. Koch and William D. Navarro

It is certified that error appears in the above-identified patent and that said Letters Patent are hereby corrected as shown below:

Column 1, line 24, "tire" should be corrected to read "tie";
         line 56, insert the word "plan" between the words "fragmentary" and "view".
Column 3, line 2, "sever" should be corrected to read "severe";
         line 9, "tp" should be corrected to read "to";
         line 47, "FIGS." should be corrected to read "FIG.";
         line 60, first occurrence, delete the word "for";
         line 67, "portion" should be corrected to read "position".
Column 4, line 6, "tire" should be corrected to read "tie";
         line 40, after "surfaces," insert the following -- "such plunger body tapered surfaces and such platen mating surfaces" --;
         line 65, after "plate" insert a comma (,).

SIGNED AND SEALED
MAR 9 1971

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,547,184　　　　　　　　Dated December 15, 1970

Inventor(s)　　　Byron W. Koch et al.

It is certified that error appears in the above-identified patent and that said Letters Patent are hereby corrected as shown below:

On the cover sheet [72], "Byron W. Kock" should read -- Bryon W. Koch --.

Signed and sealed this 22nd day of June 1971.

(SEAL)
Attest:

EDWARD M. FLETCHER, JR.　　　　　　WILLIAM E. SCHUYLER, JR.
Attesting Officer　　　　　　　　　　Commissioner of Patents